(12) United States Patent
Baumann (10) Patent No.: US 8,447,884 B1
(45) Date of Patent: May 21, 2013

(54) METHODS FOR MAPPING VIRTUAL ADDRESSES TO PHYSICAL ADDRESSES IN A NETWORK DEVICE AND SYSTEMS THEREOF

(75) Inventor: William R. Baumann, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 12/628,441

(22) Filed: Dec. 1, 2009

Related U.S. Application Data (60) Provisional application No. 61/118,926, filed on Dec. 1, 2008.

(51) Int. Cl.
*G06F 15/16* (2006.01)

(52) U.S. Cl.
USPC .......................................... 709/245; 709/216

(58) Field of Classification Search
USPC ................... 709/245, 212–219; 726/1, 11–14
See application file for complete search history.

(56) References Cited

U.S. PATENT DOCUMENTS

| | | | |
|---|---|---|---|
| 5,761,534 A | 6/1998 | Lundberg et al. | |
| 5,828,835 A | 10/1998 | Isfeld et al. | |
| 5,941,988 A | 8/1999 | Bhagwat et al. | |
| 6,026,443 A | 2/2000 | Oskouy et al. | |
| 6,115,802 A | 9/2000 | Tock et al. | |
| 6,529,508 B1 | 3/2003 | Li et al. | |
| 6,700,871 B1 | 3/2004 | Harper et al. | |
| 6,748,457 B2 | 6/2004 | Fallon et al. | |
| 6,781,990 B1 | 8/2004 | Puri et al. | |
| 6,820,133 B1 | 11/2004 | Grove et al. | |
| 7,065,630 B1 | 6/2006 | Ledebohm et al. | |
| 7,107,348 B2 | 9/2006 | Shimada et al. | |
| 7,142,540 B2 | 11/2006 | Hendel et al. | |
| 7,236,491 B2 | 6/2007 | Tsao et al. | |
| 7,281,030 B1 | 10/2007 | Davis | |
| 7,324,525 B2 | 1/2008 | Fuhs et al. | |
| 7,355,977 B1 | 4/2008 | Li | |

(Continued)

FOREIGN PATENT DOCUMENTS

| | | |
|---|---|---|
| EP | 1813084 A1 | 8/2007 |
| WO | 2006/055494 A1 | 5/2006 |

OTHER PUBLICATIONS

Bell Laboratories, "Layer 4/7 Switching and Other Custom IP Traffic Processing Using the NEPPI API," Bell Laboratories, Lucent Technologies, Murray Hill, NJ 07974 USA, pp. 1-11 (2000).

(Continued)

*Primary Examiner* — Ruolei Zong
(74) *Attorney, Agent, or Firm* — LeClairRyan, a Professional Corporation (57) ABSTRACT

A method, computer readable medium, and system for handling network packets at an application delivery controller includes receiving a packet from a communication network at a network interface controller within the application delivery controller and associating the received packet with a logical interface selected from a plurality of logical interfaces in at least one processing system using a mapping engine at the network interface controller, where each of the plurality of logical interfaces associated with a different physical address. At the network interface controller a physical address is assigned to the received packet corresponding to the selected logical interface to which data in the received packet is to be sent and a virtual address associated with the physical address in the network interface controller is retrieved. Data in the received packet and the retrieved virtual address is transmitted to the at least one processing system.

25 Claims, 3 Drawing Sheets

U.S. PATENT DOCUMENTS

| | | | |
|---|---|---|---|
| 7,376,772 | B2 | 5/2008 | Fallon |
| 7,403,542 | B1 | 7/2008 | Thompson |
| 7,420,931 | B2 | 9/2008 | Nanda et al. |
| 7,478,186 | B1 | 1/2009 | Onufryk et al. |
| 7,496,695 | B2 | 2/2009 | Go et al. |
| 7,500,028 | B2 | 3/2009 | Yamagishi |
| 7,512,721 | B1 | 3/2009 | Olson |
| 7,533,197 | B2 * | 5/2009 | Leonard et al. ............... 710/22 |
| 7,558,910 | B2 | 7/2009 | Alverson et al. |
| 7,571,299 | B2 | 8/2009 | Loeb |
| 7,647,416 | B2 | 1/2010 | Chiang et al. |
| 7,657,659 | B1 * | 2/2010 | Lambeth et al. ............ 709/250 |
| 7,668,727 | B2 | 2/2010 | Mitchell et al. |
| 7,668,851 | B2 | 2/2010 | Triplett |
| 7,729,239 | B1 | 6/2010 | Aronov et al. |
| 7,735,099 | B1 | 6/2010 | Micalizzi, Jr. |
| 7,742,412 | B1 | 6/2010 | Medina |
| 7,784,093 | B2 * | 8/2010 | Deng et al. .................. 726/11 |
| 7,826,487 | B1 | 11/2010 | Mukerji et al. |
| 7,877,524 | B1 * | 1/2011 | Annem et al. ............... 710/26 |
| 7,916,728 | B1 | 3/2011 | Mimms |
| 8,006,016 | B2 | 8/2011 | Muller et al. |
| 8,103,809 | B1 | 1/2012 | Michels et al. |
| 8,112,491 | B1 | 2/2012 | Michels et al. |
| 2002/0143955 | A1 | 10/2002 | Shimada et al. |
| 2003/0067930 | A1 | 4/2003 | Salapura et al. |
| 2003/0204636 | A1 | 10/2003 | Greenblat et al. |
| 2004/0202161 | A1 | 10/2004 | Stachura et al. |
| 2004/0249948 | A1 | 12/2004 | Sethi et al. |
| 2004/0267897 | A1 | 12/2004 | Hill et al. |
| 2005/0007991 | A1 | 1/2005 | Ton et al. |
| 2005/0083952 | A1 | 4/2005 | Swain |
| 2005/0114559 | A1 | 5/2005 | Miller |
| 2005/0175014 | A1 | 8/2005 | Patrick |
| 2006/0007928 | A1 | 1/2006 | Sangillo |
| 2006/0104303 | A1 | 5/2006 | Makineni et al. |
| 2006/0221832 | A1 | 10/2006 | Muller et al. |
| 2006/0221835 | A1 | 10/2006 | Sweeney |
| 2006/0235996 | A1 | 10/2006 | Wolde et al. |
| 2006/0288128 | A1 | 12/2006 | Moskalev et al. |
| 2008/0126509 | A1 | 5/2008 | Subramanian et al. |
| 2008/0184248 | A1 | 7/2008 | Barua et al. |
| 2009/0003204 | A1 | 1/2009 | Okholm et al. |
| 2009/0016217 | A1 | 1/2009 | Kashyap |
| 2009/0222598 | A1 | 9/2009 | Hayden |
| 2009/0248911 | A1 | 10/2009 | Conroy et al. |
| 2010/0082849 | A1 | 4/2010 | Millet et al. |
| 2010/0094945 | A1 | 4/2010 | Chan et al. |

OTHER PUBLICATIONS http://lwn.net/images/pdf/LDD3/ch15.pdf, "Memory Mapping and DMA," Chapter 15, pp. 412-63 (Jan. 2005).
Eventhelix.com, "DMA and Interrupt Handling," at http://www.eventhelix.com/RealtimeMantra/FaultHandling/dma_interrupt_handling.htm (Downloaded Oct. 2009).
Eventhelix.com, "TCP-Transmission Control Protocol (TCP Fast Retransmit and Recovery)," (Mar. 2002).
Harvey, "DMA Fundamentals on Various PC Platforms," National Instruments, Application Note 011, pp. 1-18 (Apr. 1991).
Mangino, "Using DMA with High Performance Peripherals to Maximize System Performance," WW TMS470 Catalog Applications, at http://focus.ti.com/lit/wp/spna105/spna105.pdf (Jan. 2007).
Mogul, "The Case for Persistent-Connection HTTP," SIGCOMM, Cambridge, MA USA pp. 299-313 (Oct. 1995).
Rabinovich et al., "DHTTP: An Efficient and Cache-Friendly Transfer Protocol for the Web," IEEE/ACM Transactions on Networking 12(6):1007-20 (Dec. 2004).
Stevens, "TCP Slow Start, Congestion Avoidance, Fast Retransmit, and Fast Recovery Algorithms," Standards Track Memo pp. 1-6 (Jan. 1997).
Wadge, "Achieving Gigabit Performance on Programmable Ethernet Network Interface Cards," pp. 1-9 (May 2001).
Welch, "A User's Guide to TCP Windows," pp. 1-5 (Jun. 1996).
Wikipedia, "Direct Memory Access," at http://en.wikipedia.org/wiki/Direct_memory_access, pp. 1-6 (Downloaded Oct. 2009).
Wikipedia, "Nagle's Algorithm," at Nagle's Algorithm—Wikeopedia.xps (Last Modified Oct. 2009).
Netgear GA620 Gigabit Ethernet Card Driver Source Code, printed on Oct. 22, 2007.
Alteon WebSystems, Inc., Gigabit Ethernet/PCI Network Interface Card Host/NIC Software Interface Definition, Rev. 12.4.13, Jul. 1999.
"Cavium Networks Product Selector Guide—Single & Multi-Core MIPS Processors, Security Processors and Accelerator Boards," at http://www.caviumnetworks.com, Spring 2008, pp. 1-44, Cavium Networks, Mountain View, CA, US.
"Comtech AHA Announces 3.0 Gbps GZIP Compression/Decompression Accelerator—AHA362-PCIX offers high-speed GZIP compression and decompression," www.aha.com, Apr. 20, 2005, pp. 1-2, Comtech AHA Corporation, Moscow, ID, USA.
"Comtech AHA Announces GZIP Compression and Decompression IC—Offers the highest speed and compression ratio performance in hardware on the market," www.aha.com, Jun. 26, 2007, pp. 1-2, Comtech AHA Corporation, Moscow, ID, USA.
"NITROX™ XL Security Acceleration Modules—PCI 3V or 3V/5V-Universal Boards for SSL and IPSec," at http://www.Caviumnetworks.com, (2002) pp. 1, Cavium Networks, Mountain View, CA USA.
"PCI, PCI-X," at http://www.cavium.com/acceleration_boards_PCI_PCI-X.htm, Downloaded Oct. 2008, 1 page, Cavium Networks—Products > Acceleration Boards > PCI, PCI-X.
Salchow, Jr., KJ, "Clustered Multiprocessing: Changing the Rules of the Performance Game," F5 White Paper, Jan. 2008, pp. 1-11, F5 Networks, Inc.

* cited by examiner

METHODS FOR MAPPING VIRTUAL ADDRESSES TO PHYSICAL ADDRESSES IN A NETWORK DEVICE AND SYSTEMS THEREOF

This application claims the benefit of U.S. Provisional Patent Application Ser. No. 61/118,926, filed on Dec. 1, 2008, which is hereby incorporated by reference in its entirety.

FIELD

Various aspects of the technology disclosed herein generally relate to network traffic management, and more particularly to mapping virtual addresses to physical addresses in an application delivery controller.

BACKGROUND

An application delivery controller, which includes a network interface controller, is a device that manages network traffic between clients and servers and is interposed between the clients and the servers. A network interface controller (e.g., a network interface card or "NIC") is a hardware device within the application delivery controller that provides a connection between a network and a processing system such as a motherboard in the application controller device or at a computing device (e.g., a personal computer, laptop computer, etc.). With reference to the Open Systems Interconnection ("OSI") conceptual network model, a network interface controller can perform processing of data at the data link layer ("Layer-2"), and the physical layer ("Layer-1"). For example, a network interface controller can be a high-speed Ethernet host adapter. A network interface controller can receive a packet of data, perform Layer-1 and Layer-2 processing on that packet, and send the processed data to the computer motherboard. The computer motherboard stores that data in a system memory that is assigned a physical address.

A microprocessor (e.g., a system central processing unit or "CPU") accesses locations in the system memory on the computer motherboard using the unique physical addresses of those memory locations. System software executing on the computer motherboard, however, typically accesses data using virtual addresses. Consistent with a layering approach to computing, referring to memory locations using virtual addresses provides advantages such as allowing multiple instances of the same application to refer to different physical address locations using the same virtual address.

Current high-speed Ethernet host adapters are only able to refer to physical addresses. Device driver software associated with the network interface controller, and executing on the CPU, has to track virtual addresses associated with the physical addresses where the incoming data is stored. Unfortunately, to do so, the driver software consumes computing resources, such as CPU cycles and system memory. Moreover, implementation of this functionality of tracking virtual addresses in the driver software undesirably increases complexity of the driver software.

SUMMARY

A network interface controller includes a network transceiver configured to receive a packet from a network and a processing system transceiver configured to communicate with at least one processing system. The network interface controller includes a mapping engine configured to provide a physical address to which data from the received packet is to be sent and a virtual address associated with the physical address to the at least one processing system via the processing system transceiver. The mapping engine includes mapping logic configured to associate the received packet with a corresponding logical interface selected from a plurality of logical interfaces at the processing system, where each of the plurality of logical interfaces associated with a plurality of different physical addresses.

A method for handling one or more network packets at an application delivery controller includes receiving a packet from a communication network at a network interface controller within the application delivery controller and associating the received packet with a logical interface selected from a plurality of logical interfaces in at least one processing system using a mapping engine at the network interface controller, where each of the plurality of logical interfaces associated with a plurality of different physical addresses. The method includes assigning at the network interface controller a physical address selected from the plurality of physical addresses to the received packet corresponding to the selected logical interface to which data in the received packet is to be sent and retrieving a virtual address associated with the physical address in the network interface controller. The method includes transmitting data in the received packet and the retrieved virtual address to the at least one processing system.

A computer readable medium having stored thereon instructions for handling one or more network packets at an application delivery controller includes machine executable code, which when executed by at least one processor, causes the at least one processor to perform steps including receiving a packet from a communication network at a network interface controller within the application delivery controller and associating the received packet with a logical interface selected from a plurality of logical interfaces in at least one processing system using a mapping engine at the network interface controller, where each of the plurality of logical interfaces associated with a plurality of different physical addresses. The steps include assigning at the network interface controller a physical address selected from the plurality of different physical addresses to the received packet corresponding to the selected logical interface to which data in the received packet is to be sent and retrieving a virtual address associated with the physical address in the network interface controller. The steps include transmitting data in the received packet and the retrieved virtual address to the at least one processing system.

DETAILED DESCRIPTION

Figure 1:
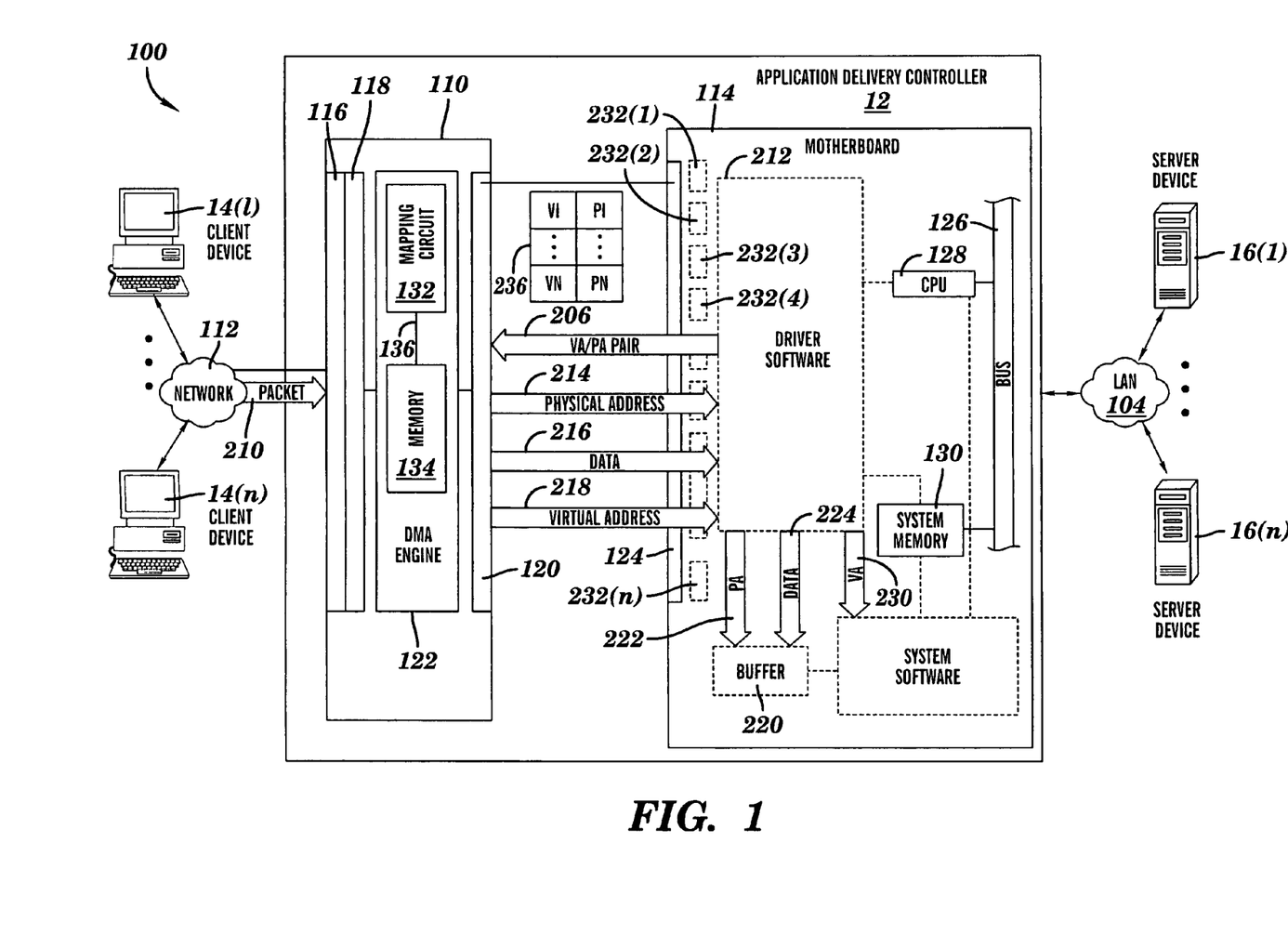
FIG. 1 is a partial block diagram and partial functional diagram of an application delivery controller including a network interface controller device communicating with a processor device for handling network packets.

An exemplary network environment 100 in which virtual addresses are mapped to physical addresses in an application delivery controller 12 is illustrated in FIG. 1. The exemplary network environment 100 includes the application delivery controller 12, client computing devices **14(1)-14(*n*), server devices 16(1)-16(*n*), a communication network 112**, and a Local Area Network (LAN) 104, although the environment could include other types and numbers of systems, devices, blades, components, elements, and communication networks in other configurations. Among other advantages, the mapping of virtual addresses to physical addresses at a network interface controller 110 within application delivery controller 12 reduces complexity of driver software 212 executing on a processing system 114.

Each of the client computing devices 14(1)-14(n) includes a central processing unit (CPU) or processor, a memory, and an interface or I/O system which are coupled together by a bus or other link, although other numbers and types of network entities and other numbers and types of the systems, devices, and components in the client computing device could be used. The processor in each of the client computing devices 14(1)-14(n) executes a program of stored instructions or parts thereof for one or more aspects of the technology as illustrated and described herein. The memory in client computing devices 14(1)-14(n) stores these programmed instructions for one or more aspects of the technology as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor can be used for the memory. The interface system is used to operatively couple each of the client computing devices 14(1)-14(n) for communications via the communications network 112 with the application delivery controller 12, and via LAN 104 to one or more of the server devices 16(1)-16(n), although other types and numbers of communication networks or systems with other types and numbers of connections and configurations to other systems, devices and components can be used.

The client computing devices 14(1)-14(n) in this example can run interface applications such as Web browsers that can provide an interface to make requests for and send data to different Web server-based applications via the communication network 112. A series of applications can run on the server devices 16(1)-16(n) that allow the transmission of data that is requested by the client computing devices 14(1)-14(n). The server devices 16(1)-16(n) can provide data or receive data in response to requests directed toward the respective applications on the server devices 16(1)-16(n) from the client computing devices 14(1)-14(n). As per the TCP, packets can be sent to the server devices 16(1)-16(n) from the requesting client computing devices 14(1)-14(n) to send data. It is to be understood that the server devices 102 can be hardware or software or can represent a system with multiple servers, which can include internal or external networks. In this example the server devices 102 can be any version of Microsoft® IIS servers or Apache® servers, although other types of servers can be used. Further, additional servers can be coupled to the communication network 112 and many different types of applications can be available on servers coupled to the communication network 112.

Generally, the client computing devices 14(1)-14(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run Web browsers that can provide an interface to make requests to different Web server-based applications via the communication network 112. A series of Web-based applications can run on the application servers 16(1)-16(n) that allow the transmission of data that is requested by the client computing devices 14(1)-14(n). The client computing devices 14(1)-14(n) can be further configured to engage in a secure communication with the application delivery controller 12 and/or the server devices 16(1)-16(n) using mechanisms such as Secure Sockets Layer (SSL), Internet Protocol Security (IPSec), Tunnel Layer Security (TLS), and the like.

Each of the server devices 16(1)-16(n) includes a central processing unit (CPU) or processor, a memory, and an interface or I/O system which are coupled together by a bus or other link, although other numbers and types of network entities and other numbers and types of the systems, devices, and components in the server could be used. The processor in each of the server devices 16(1)-16(n) executes a program of stored instructions for one or more aspects of the technology as illustrated and described herein. The memory in each of the server devices 16(1)-16(n) stores these programmed instructions or parts thereof for one or more aspects of the technology as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor can be used for the memory. The interface system is used to operatively couple each of the server devices 16(1)-16(n) with the application delivery controller 12 and one or more of the client computing devices 14(1)-14(n), although other types and numbers of communication networks or systems with other types and numbers of connections and configurations to other systems, devices, blades, components and other elements can be used.

Server devices 16(1)-16(n) comprise one or more server computing machines capable of operating one or more Web-based applications that may be accessed by network devices in the communication network 112, such as client computing devices 14(1)-14(n), via application delivery controller 12, and may provide other data representing requested resources, such as particular Web page(s), image(s) of physical objects, and any other objects, responsive to the requests, although the server devices 16(1)-16(n) may perform other tasks and provide other types of resources. It is also contemplated that one or more of the server devices 16(1)-16(n) may be a cluster of servers managed by the application delivery controller 12. It is to be understood that the server devices 16(1)-16(n) may be hardware or software or may represent a system with multiple server devices 16(1)-16(n), which may include internal or external networks. In this example the server devices 16(1)-16(n) may be any version of Microsoft® IIS servers or Apache® servers, although other types of servers may be used. Additionally, in this example the application delivery controller 12 is coupled to the server devices 16(1)-16(n) through LAN 104, although the servers and controller may be coupled together via other topologies (e.g., a Storage Area Network or "SAN"). Further, additional servers may be coupled to the LAN 104 and many different types of applications may be available on servers coupled to the LAN 104

The communication network 112 is a communication network which uses TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used. In this example, the communication network 112 comprises a publicly accessible network, such as the Internet, which includes client computing devices 14(1)-14(n), although the communication network 112 may comprise other types of private and public networks that include other devices. Communications, such as requests from client computing devices 14(1)-14(n) and responses from server devices 16(1)-16(n), take place over the communication network 112 according to standard network protocols, such as the HTTP and TCP/IP protocols in this example, but the principles discussed herein are not limited to this example and can include other protocols. Further, the communication network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. The communication network 112 may include any communication medium and method by which data may travel between client computing devices 14(1)-14(n), server devices 16(1)-16(n) and application delivery controller 12, and these examples are provided by way of example only.

Although an exemplary network environment 100 with application delivery controller 12, client computing devices 14(1)-14(n), server devices 16(1)-16(n), communication network 112, and LAN 104 are described and illustrated herein, other types and numbers of systems, devices, blades, components, and elements in other configurations can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those ordinary skill in the art.

In addition, two or more computing systems or devices can be substituted for any one of the systems in any example. Accordingly, principles and advantages of distributed processing, such as redundancy and replication also can be implemented, as desired, to increase the robustness and performance of the devices and systems of the examples. The examples may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

Figure 2:
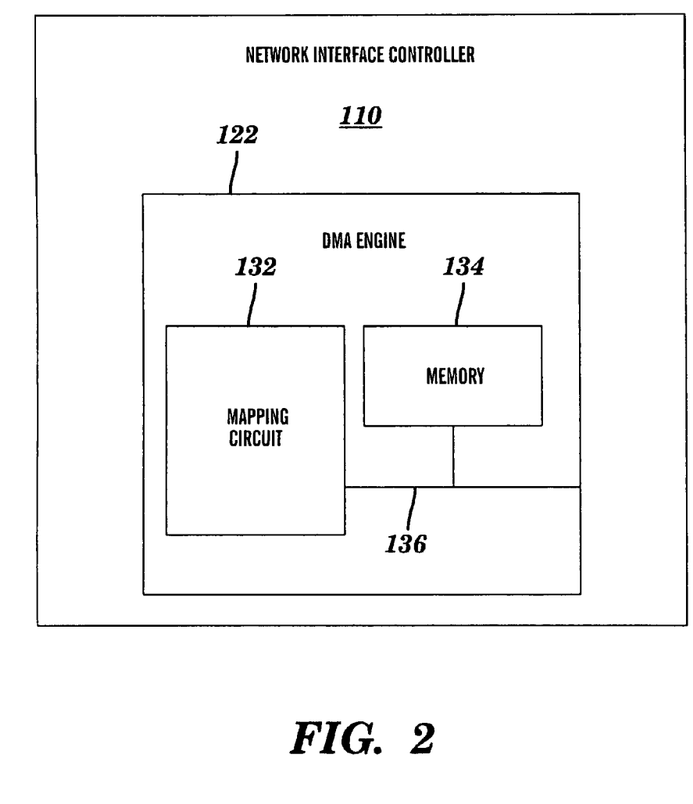
FIG. 2 is a diagram of a direct memory access (DMA) engine in the network interface controller device shown in FIG. 1.

Referring now to FIGS. 1-2, application delivery controller 12 including a network interface controller 110 further including a direct memory access (DMA) engine 122 is disclosed, although other types and numbers of systems, devices, blades, components, and elements in other configurations within the application delivery controller 12 for mapping physical addresses to virtual addresses can be used. For example, the application delivery controller 12 that includes network interface controller 110 shown in FIG. 1 in this example can be a standalone device, such as a BIG-IP® application delivery controller offered by F5 Networks, Inc., of Seattle, Wash. Alternatively, it should be appreciated that the application delivery controller 12 could also be one of several blade servers coupled to a chassis device, such as a VIPRION® application delivery controller, also offered by F5 Networks, Inc., of Seattle, Wash. Various aspects of the present methods, computer readable medium, and systems as described herein provide a number of advantages as will be apparent to one skilled in the art after reading the disclosure set forth below. For example, the technology described herein provides at the network interface controller 110 (within application delivery controller 12), direct mapping between physical addresses of one or more memory elements in a processing system and virtual addresses used by system and application software residing and executing on the processing system so that processing system resources (e.g., processor clock cycles and processor memory) can be optimally utilized.

As shown in the example environment 100 depicted in FIG. 1, the application delivery controller 12 can be interposed between the client computing devices 14(1)-14(n) coupled to the communication network 112 and the server devices 16(1)-16(n) coupled to the LAN 104 as shown in FIG. 1. Again, the environment 100 could be arranged in other manners with other numbers and types of devices. Also, the application delivery controller 12 is coupled to communication network 112 by one or more network communication links and intermediate network devices, such as routers, switches, gateways, hubs and other devices (not shown). It should be understood that the devices and the particular configuration shown in FIG. 1 are provided for exemplary purposes only and thus are not limiting.

Generally, the application delivery controller 12 manages network communications, which may include one or more client requests and server responses, from/to the communication network 112 between the client computing devices 14(1)-14(n) and one or more of the server devices 16(1)-16(n) in LAN 104 in these examples. These requests may be destined for one or more servers 102, and, as alluded to earlier, may take the form of one or more TCP/IP data packets originating from the communication network 112, passing through one or more intermediate network devices and/or intermediate networks, until ultimately reaching the application delivery controller 12, for example. In any case, the application delivery controller 12 may manage the network communications by performing several network traffic management related functions involving the communications, such as load balancing, access control, VPN hosting, network traffic acceleration, and handling or otherwise managing multiple, fully isolated and independently resettable, direct memory access channels in accordance with the processes described further below in connection with FIG. 3, for example.

More specifically, FIG. 1 illustrates an example of the network environment 100 that includes network interface controller 110 that is part of application delivery controller 12 coupled between communication network 112 and LAN 104, although the communication network environment 100 can comprise other types and numbers of systems, devices, components, and elements in other configurations.

The network interface controller 110 can be a network interface card that can be inserted in a Peripheral Component Interconnect (PCI) slot of the application delivery controller 12, although other types and numbers of network interfacing systems, devices, components and elements could be used. The network interface controller 110 can be coupled to a communication network 112 through network transceiver 116 to send and receive packets comprising data and other information. The network interface controller 110 can be, by way of example only, a high-speed Ethernet host adapter. The network interface controller 110 is coupled to the processing system 114 to communicate information to and from the processing system 114 through a processing system transceiver 120.

The network interface controller 110 can be used to operatively couple data communications between one or more of the client computing devices and one or more of the server devices, although other types and numbers of systems, devices, blades, components, and elements could be coupled together. In this example, the network interface controller 110 is a field programmable gate array (FPGA) configured as a high speed bridge with logic to implement one or more aspects of the technology, including by way of example only, providing direct mapping between physical addresses of one or more memory elements in a processing system and virtual addresses used by system and application software residing and executing on the processing system, although the network interface controller 110 can comprise other types and numbers of systems, devices, blades, components, and elements configured in other manners which could implement one or more aspects of the technology. For example, network interface controller 110 can be implemented as one or more "blades" where the term "blade" refers to one of multiple electronic circuit boards or cards that are installed in a hardware chassis with a backplane. An exemplary blade can include one or more processors, volatile and non-volatile memory, interfaces suitable for communicating information to and from the blade, and other components for enabling the operation of one or more applications. A blade can also include a specialized interface for the backplane and other interfaces, such as a USB port, FIREWIRE port, serial port, RF interface, IR interface, Ethernet interface, IDE controller, and the like. An application running on a blade can employ any of these interfaces to communicate information to other applications running on other blades and/or devices coupled to the blade server. Network interface controller 110 can also be implemented as a combination of blades and additional components in a chassis of the application delivery controller 12 (e.g., the VIPRION® application delivery controller, noted above).

The communication network 112 can be, for example, a local area network ("LAN"), wide area network ("WAN"), an intranet, or the Internet implemented, for example, using modems and phone-lines, wireless links, each having their own standards and protocols, and having devices supported by Internet protocols including HTTP, file transfer protocol (FTP), secure sockets layer (SSL), streaming media, DNS, UDP, and e-mail (SMTP), for example. The communication network 112 can include devices communicating using Ethernet and TCP/IP standards, or industry-standard protocols, for example, SOAP, XML, LDAP, and SNMP for handling and communicating data in packets. Further, communication network 112 may also be implemented on computer system or systems that extend across any suitable network using any suitable interface mechanisms and communications technologies, including by way of example only, telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

LAN 104 can include a private local area network that includes the application delivery controller 12 coupled to the one or more servers 16(1)-16(n), although the LAN 104 may comprise other types of private and public networks with other devices. Networks, including local area networks, besides being understood by those skilled in the relevant arts, have already been generally described above in connection with communication network 112, and thus will not be described further here.

Packets can include electronic data (e.g., a message to be sent) along with overhead information (e.g., Ethernet port information used for packet headers), which is used by various devices along the transmission path to determine how to handle the packets. Packets destined for the host device, e.g., the processing system 114, can be received from the network 112 through the network transceiver 116. A packet processor 118 within network interface controller 110 can perform OSI Layer-1 and OSI Layer-2 processing on the overhead information of the received packet. Similarly, data that the processing system 114 wishes to transmit can be processed by the packet processor 118 to add the OSI Layer-1 and OSI Layer-2 overhead information so that the packet can be properly transmitted to a destination. The processed packet can be sent to the network 112 through the network transceiver 116.

Communication between processing system 114 and network interface controller 110 can take place using an exemplary protocol for using network interface controller 110 to perform physical address/virtual address mapping. Data 224 received by the processing system 114 can be stored in a buffer memory 220 in the processing system 114. According to one aspect of the methods, computer readable medium, and systems as described herein, buffer memory 220 can be a memory space in system memory 130 allocated for the receipt of data from the network 112. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to a Central Processing Unit (CPU) 128 can be used for system memory 130.

The location of a particular buffer in the buffer memory 220 can be assigned a unique physical address. System software 226 executing on the CPU 128 can access the received data in the buffer memory 220 using virtual addresses. The CPU 128 can execute driver software 212 specific to the network interface controller 110 for processing information communicated to and from the network interface controller 110. For example, the driver software 212 can translate higher-level commands from the CPU 128 into instructions specific to the network interface controller 110. The driver software 212 consumes resources of the CPU 128 and system memory 130 resources in performing its tasks.

The processing system 114 receives data at one of plurality of logical interfaces 232(1)-232(n), for example only, at logical interface 232(1). The logical interface 232(1) corresponds to a specific application or set of applications executing on the CPU 128. Alternatively, logical interface 232(1) corresponds to system software 226 that supports other application software or executes independent instructions by itself. Although FIG. 1 is described herein using logical interface 232(1) as an example, according to one aspect of the technology disclosed herein, a plurality of logical interfaces 232(1)-232(n) can be associated with the processing system 114 corresponding to multiple applications. Thus, the plurality of logical interfaces 232(1)-232(n) are associated with CPU 128, system bus 126, and system memory 130, although the plurality of logical interfaces 232(1)-232(n) may be associated with more than one CPUs, system buses and/or system memory units. Separate instances of driver software 212, buffer memory 220, and system software 226 can be associated with the separate logical interfaces. The logical interfaces 232(1)-232(n) facilitate the use of multiple virtual addresses used by multiple application instances corresponding to the same physical address. Alternatively, logical interfaces 232(1)-232(n) can facilitate the use of unique virtual addresses to unique physical addresses.

The processing system 114 can be in the form of a computer motherboard, although other types and numbers of processing systems, devices, components and elements can also be used. The processing system 114 can be a printed circuit board typically included within the application delivery controller 12 that also includes the network interface controller 110. Alternatively, the processing system 114 may be in a computer (e.g., a personal computer, laptop computer, or other network traffic management device) that includes computing components, e.g., CPU 128 (also referred to as the processor, or controller) and a system memory 130 coupled to each other via a system bus 126. It is to be noted that although a single processing system 114 is illustrated in FIG. 1, various aspects of the methods, computer readable medium, and systems disclosed herein can be implemented in a plurality of processing systems, e.g., two or more processing systems. Processing system 114 can be coupled to other computing elements, for example, a display, an input-output device, a graphics co-processor, a power supply, and one or more portable storage devices. By way of example only, processing system 114 can include Core-Duo® processors provided by Intel Corporation of Santa Clara, Calif., although other special purpose processors may also be included in processing system 114.

Processing system 114 communicates information to and from the network interface controller 110 through a transceiver 124. The transceiver 124, CPU 128, and system memory 130 are coupled to the system bus 126 such that information can be communicated among the transceiver 124, the CPU 128, and the system memory 130. The processing system 114 can be assembled in a housing that also contains one or more peripheral devices, or can be housed separately from one or more peripheral devices. For example, the application delivery controller 12 that includes a PCI slot for inserting network interface controller 110 can contain other devices, e.g., a communication port, a computer motherboard in the same housing with a CD-ROM drive, an can additionally be coupled to external peripheral devices such as a printer, a monitor, a keyboard, and a mouse associated with an external client computer system or an external server. The processing system 114 can be considered a host device that acts as a host processor to network interface controller 110.

Referring to FIG. 2, network interface controller 110 includes DMA engine 122 coupled to the processing system transceiver 120 and the network transceiver 116. DMA engine 122 includes mapping logic 132, e.g., a mapping logic circuit, configured to maintain a mapping engine, as described in more detail below, and a memory 134 configured to store a physical address 214 and a virtual address 218 (shown in FIG. 2 below). Mapping logic 132 and memory 134 are coupled to each other by an internal bus 136 for exchanging signals. The mapping logic 132 can include an application specific integrated circuit ("ASIC"), field programmable gate array ("FPGA"), digital signal processor ("DSP"), a microprocessor, or other processing device capable of performing functionality in hardware, software, firmware, or combinations thereof. Mapping logic 132 can be configured to perform one or more actions including associating a packet with a corresponding logical interface selected from one of the plurality of logical interfaces 232(1)-232(n) at the processing system 114, identifying a location in the memory 134 storing the physical address and the virtual address, reading the virtual address 218 from the memory 134, transmitting the data from the received packet to the physical address 214, and transmitting the virtual address 218 to the processing system 114 for use by system software.

Figure 3:
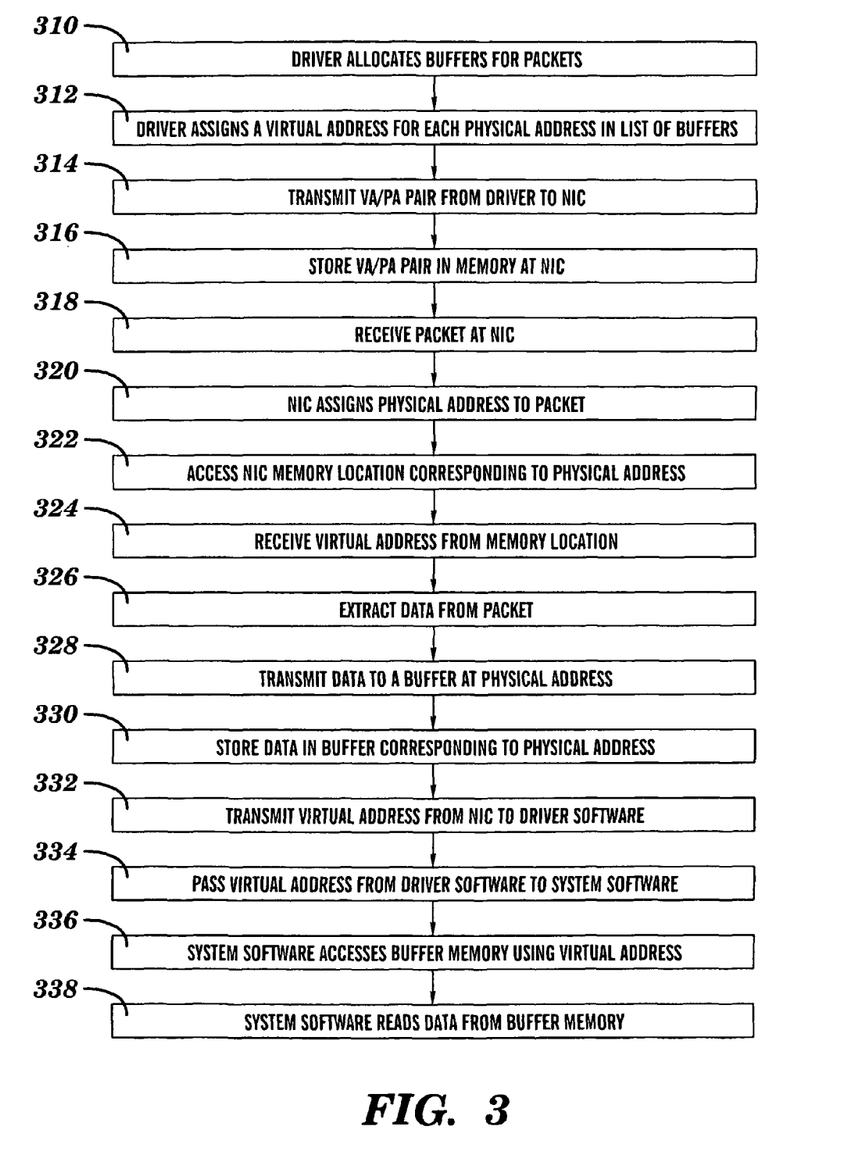
FIG. 3 is a flow chart of a process for mapping virtual addresses to physical addresses in a network interface controller device.

A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to mapping logic 132 can be used for memory 134. Further, memory 134 also stores one or more computer-readable instructions that may be executed by the mapping logic 132 within network interface controller 110. When these stored instructions are executed, they may implement a process that is illustrated, for exemplary purposes only, by the flow chart 300 shown in FIG. 3. It should be appreciated that the flow chart 300 shown in FIG. 3 is representative of example steps or actions that may be embodied or expressed as one or more computer or machine readable instructions that may be executed by the network interface controller 110 and/or the CPU 128 in the application delivery controller 12 shown in FIGS. 1-2. In this example, the machine readable instructions may embody an algorithm or computer program for execution by at least one of: (a) one or more processors each having one or more processor cores, (b) hardware specifically configured to perform the instructions (e.g., ASICs, FPGAs) and (c) one or more other suitable processing device(s). The algorithm or computer program may be embodied in software stored on memory 134, for example.

Moreover, persons of ordinary skill in the art will readily appreciate that the entire algorithm or computer program, and/or parts thereof, could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the network interface controller 110, the application delivery controller 12, or even the clients and servers with whom the application delivery controller 12 communicates, could be implemented by software, hardware, and/or firmware (and combinations thereof). Further, although the example algorithm is described with reference to the flowchart 300 illustrated in FIG. 3, persons of ordinary skill in the art will readily appreciate that many other methods of implementing the example machine readable instructions may alternatively be used. For example, the order of execution of the blocks may be changed, and/or some of the blocks described may be changed, eliminated, or combined.

According to one aspect, DMA engine 122 includes computer readable medium having stored thereon instructions for handling network packets and mapping virtual addresses to physical addresses. The instructions include machine executable code, which when executed by at least one processor within mapping logic 132, causes the processor to perform one or more steps of flowchart 300 of FIG. 3, described in more detail below.

The operation of the example process for mapping virtual addresses to physical addresses at the network interface controller 110 shown in FIG. 3 will now be described with reference back to FIGS. 1-2. The flowchart 300 in FIG. 3 is representative of example steps or actions that may be embodied or expressed as one or more computer or machine readable instructions stored on computer readable medium that may be executed by the network interface controller 110 and/or the CPU 128 shown in FIG. 1 to perform a process for handling different types of data in data packets. In this example, the machine readable instructions may embody an algorithm or computer program for execution by at least one of: (a) a one or more processors each having one or more processing cores, (b) hardware specially configured to perform the instructions (e.g., ASICs, FPGAs), and/or (c) one or more other suitable processing device(s) associated with mapping logic 132.

Referring now to FIG. 3, the process begins in the application delivery controller 12 at step 310, where the driver software 212 allocates buffers in the buffer memory 220 for receiving incoming packets of data. The driver software 212 is configured to maintain a list of the buffers in the buffer memory 220 where each buffer has a physical address.

In step 312, a virtual address to each physical address in the list of buffers is assigned by the driver software 212. Each physical address and its corresponding virtual address are referred to as a virtual address/physical address pair (or, "VA/PA" pair). The list of VA/PA pairs corresponds to one or more of the logical interface 232(1)-232(n), and various applications supported by logical interfaces 232(1)-232(n) at various instances of time. Within the list corresponding to the logical interfaces 232(1)-232(n), there is, for example, a one-to-one mapping between virtual addresses and physical addresses. Since there can be multiple logical interfaces 232(1)-232(n), more than one of logical interfaces 232(1)-232(n) refer to the same physical address with a different virtual address. Alternatively, more than one of logical interfaces 232(1)-232(n) can refer to different physical addresses with the same virtual address. Each list can include other information, for example the length of the buffer corresponding to the physical address of each VA/PA pair.

In step 314, the driver software 212 and associated driver logic transmits the list(s) of virtual address-physical address ("VA/PA") pairs 208 from the processing system 114 to the network interface controller 110. For example, the driver software 212 transmits a list or a table 236 including one or more physical address-virtual address pairs (shown in FIG. 1 as a table "V1/P1-VN/PN"), corresponding to one of the logical interfaces 232(1)-232(n), via transceiver 124, to the network interface controller 110. Driver software associated with other logical interfaces among logical interfaces 232(1)-232(n) transmits similar lists or tables. By way of example only, typically the first physical address in the table 236 is allocated to the first logical interface 232(1), although other allocations may also be used. In addition, logical interfaces 232(1)-232(n) may be associated with a plurality of different physical addresses.

In step 316, the network interface controller 110 receives the lists of VA/PA pairs at the processing system transceiver 120, and forward and store the VA/PA pairs in the memory 134 of the DMA engine 122 (shown in FIG. 2). Depending on internal storage arrangement, DMA engine 122 can either break apart and store each VA/PA pair of the list separately in the memory 134, or can store the VA/PA pairs together.

In step 318, the network interface controller 110 receives packets sent to the computer by other devices connected to the network 112. When data is transmitted from a location on the network 112 directed to the processing system 114, a packet 210 is received at the network interface controller 110 through the network transceiver 116. For example, packet 210 can be destined for one of the logical interfaces 232(1)-232(n) of the processing system 114. The packet processor 118 can extract/strip-off the overhead information from the packet 210 and analyze the overhead information to determine which one of the logical interfaces 232(1)-232(n) in the processing system 114 packet 210 is destined for.

In step 320, the packet processor 118 passes this information to the DMA engine 122. The mapping logic 132 of the DMA engine 122 (shown in FIG. 2) assigns the next available physical address to the received packet 210. The mapping engine maintained by DMA engine 122 tracks the physical addresses it has assigned so that it does not assign more than one packet to the same physical address until the physical address is freed by the processing system 114.

With reference to FIG. 2, the network interface controller 110 uses the mapping logic 132 of the DMA engine 122 to retrieve the virtual address 218 corresponding to the physical address 214. The mapping logic 132 determines, from the information received from the packet processor 118, which list corresponds to the destination logical interface among the plurality of logical interfaces 232(1)-232(n) of the packet 210. The mapping logic 132 and the memory 134 corresponds to one of the logical interfaces 232(1)-232(n), or portions of the mapping logic 132 and the memory 134 can be partitioned to correspond to one of the logical interfaces 232(1)-232(n).

In step 322, the mapping logic 132 identifies a location in the memory 134 corresponding to the physical address 214 for that particular list corresponding to application instances associated with logical interfaces 232(1)-232(n). The mapping logic 132 accesses the corresponding memory location in memory 134.

Subsequently, in step 324, the virtual address 218 of the VA/PA pair from the memory location in the memory 134 is retrieved by the network interface controller 110. For example, the VA/PA pair can be stored as a 128-bit number, with the higher 64 bits representing the physical address and the lower 64 bits representing the virtual address, although other bit values can also be used for storing the VA/PA pair. The mapping logic 132 can separate the 128-bit number into the two 64-bit numbers representing the physical and virtual addresses of the VA/PA pair, respectively.

In step 326, the network interface controller 110 extracts data from the packet 210. In addition to data being extracted from the packet 210, the packet processor 118 separates the packet 210's data from the overhead information contained in packet 210.

In step 328, referring back to FIG. 1, the network interface controller 110 transmits data 216 extracted from the packet 210 to a specific buffer in buffer memory 220 corresponding to the physical address 214 that the network interface controller 110 assigned to the packet 210 that carried the data. Specifically, the data 216 is received at the processing system 114 by the driver software 212, which communicates the data 224 (equivalent to data 216) to the buffer in the buffer memory 220 corresponding to a physical address (PA) 222 (equivalent to physical address 214) assigned to the packet 210.

In step 330, the processing system 114 stores the data 224 in the buffer corresponding to the physical address 222 of buffer memory 220.

In step 332, the network interface controller 110 transmits the virtual address 218 of the VA/PA pair to the driver software 212 corresponding to one of the logical interfaces 232(1)-232(n). Transmission of the virtual address 218 by the network interface controller 110 can be interpreted (for example, by the driver software 212 or the system software 226) as an indication that the data is stored in the buffer memory 220 and is ready to be accessed. Alternatively, after data has been transmitted to several physical addresses, the network interface controller 110 can transmit a list of virtual addresses corresponding to physical addresses to which the network interface controller 110 has sent data 224 to be stored at the processing system 114.

In step 334, the driver software 212 passes the virtual address (VA) 230 (equivalent to virtual address 218) to the correct application of the system software 226 corresponding to a destination logical interface among logical interfaces 232(1)-232(n). Subsequently, in step 336, system software 226 then accesses the buffer in the buffer memory 220 corresponding to the physical address 222 using the virtual address 230. Finally, in step 338, system software 226 reads data 224 corresponding to the VA/PA pair from the buffer in buffer memory 220.

As disclosed herein, the driver software 212 is not required to ascertain which one of logical interface 232(1)-232(n) the data 216 is intended for, nor must the driver software 212 map virtual addresses to physical addresses. Instead, VA/PA mapping is performed by mapping engine maintained by the DMA engine 122 of the network interface controller 110. Thus, the CPU 128 and the system memory 130 of the processing system 114 do not spend resources on VA/PA mapping. Moreover, complexity of the driver software 212 that communicates with the network interface controller 110 is reduced, since driver software 212 does not perform the VA/PA mapping. Because the VA/PA mapping can be performed by parts of a dedicated hardware device, i.e., the network interface controller 110, overall network traffic performance can be improved. Furthermore, because the VA/PA mapping is performed by the network interface controller 110, the address information is communicated to and from the driver software 212 in device specific terms that the driver software 212 can understand with minimal processing. Thus, the driver software 212 can simply use addresses passed back from the network interface controller 110, which is much more efficient than mapping VA/PA information using the driver software 212 within processing system 114.

According to one aspect of the methods, computer readable medium, and systems disclosed herein, flowchart 300 implements a method for handling network packets (e.g., packet 210) at an application delivery controller 12 in the network environment 100, the method including receiving a packet from communication network 112 at network interface controller 110 within the application delivery controller 12, associating the received packet 210, with the logical interface 232(1) selected from the plurality of logical interfaces 232(1)-232(n) in at least one processing system 114 using a mapping engine including mapping logic 132 at the network interface controller 110, each of the plurality of logical interfaces 232(1)-232(n) associated with a different physical address, retrieving from a memory 134 in the network interface controller 110 the virtual address 218 associated with the physical address 214, and transmitting data in the received packet 210 and the retrieved virtual address 218 to processing system 114.

The method for handling network packets according to the aspects of the methods, computer readable medium, and systems disclosed herein can further include receiving from the processing system 114 of FIGS. 1-2, VA/PA pair 208 associated with logical interface 232(1) of an application executing on the processing system 114, storing the received VA/PA pair 208 at the memory 134, and extracting data in the received packet 210 prior to transmitting to processing system 114. The extracting step can include, for example, extracting overhead information from the received packet 210 at the network interface controller 110, by packet processor 118, and performing the associating based on the overhead information. The overhead information used can come directly from various fields in standard packet headers, e.g., in layer 1, in layer 2, or indirectly from calculations or table lookups based upon these various fields. Standard packet headers can include any layer header such as the HTTP URL. The method can include the transmitting the retrieved virtual address 218 by communicating the virtual address 218 to a system software 226 executing on processing system 114.

According to various aspects of the methods, computer readable medium, and systems disclosed herein, the virtual address 218 uniquely corresponds to the physical address 214. Alternatively, the virtual address 218 corresponds to distinct physical addresses at different points in time.

Flowchart 300 can be used to implement receiving at the network interface controller 110 the table 236 of VA/PA pairs, where each physical address-virtual address pair in the table 236 corresponds to separate logical interfaces of applications executing simultaneously in the processing system 114. The network interface controller 110 communicates to the processing system 114 one or more physical address-virtual address pairs from the table 236 that have not been associated with the logical interfaces.

In conclusion, DMA engine 122 can be implemented in exemplary application delivery controller 12, more specifically in the network interface controller 110 within the application delivery controller 12, or other network interface device. This eliminates the requirement that driver software 212 perform physical address to virtual address mapping, thus reducing the complexity of the driver software 212 as well as the resources that the driver software 212 consumes. Various aspects of the present methods, computer readable medium, and systems disclosed herein provides a number of features including providing direct mapping at a network interface controller device between physical addresses of one or more memory elements in a processing system and virtual addresses used by system and application software residing and executing on the processing system so that processing system resources (e.g., processor clock cycles and processor memory) can be optimally utilized. Aspects of the present methods, computer readable medium, and systems disclosed herein relieve the driver software 212 from having to continuously track the virtual addresses available for system software 226 to use. As a result, lesser interrupts to the CPU 128 by the driver software 212 are encountered leading to faster overall computing in network environment 100. Further, since the physical address-virtual address mapping functionality is no longer with the driver software 212, computational complexity of the driver software 212 is reduced resulting in improvements in overall network traffic.

It should be appreciated that some portions of the detailed description have been presented in terms of procedures, steps, logic blocks, processing, and other symbolic representations of operations on data bits that can be performed on computer memory. A procedure, computer/machine executed step, action, logic block, process, etc., are here conceived to be a self-consistent sequence of steps or instructions leading to a desired result. The steps are those utilizing physical manipulations of physical quantities. These quantities can take the form of electrical or magnetic signals capable of being stored, transferred, combined, compared, and otherwise manipulated in a computer and/or processing system. Further, these signals can have been referred to at times as bits, values, numbers, or the like. Finally, each step can be performed by hardware, software, firmware, or combinations thereof.

Having thus described the basic concept of the methods, computer readable medium, and systems disclosed herein, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the methods, computer readable medium, and systems disclosed herein. Additionally, the recited order of processing elements or sequences, or the use of numbers, letters, or other designations therefore, is not intended to limit the claimed processes to any order except as can be specified in the claims. Accordingly, the methods, computer readable medium, and systems disclosed herein are limited only by the following claims and equivalents thereto.

What is claimed is:

1. A method for mapping virtual addresses to physical addresses, the method comprising:
   receiving a packet at a network interface controller within a network device;
   identifying a logical interface configured to handle the received packet by analyzing at least a portion of the received packet, wherein the logical interface corresponds to one or more applications executing on at least one processing system of the network device;
   assigning an available physical address to the received packet, wherein the available physical address is associated with the identified logical interface and identifies a buffer location in a buffer memory;
   retrieving, from a memory of the network interface controller, a virtual address assigned to the physical address in accordance with the identified logical interface;
   extracting data to be handled by the logical interface from the received packet;
   storing the extracted data to the buffer location in the buffer memory identified by the assigned physical address; and
   transmitting the retrieved virtual address to the at least one processing system, wherein the data stored in the buffer location can be accessed by the processing system using the corresponding retrieved virtual address.

2. The method as set forth in claim 1 further comprising:
   receiving from the at least one processing system a physical address-virtual address pair associated with the logical interface associated with an application executing on the at least one processing system; and
   storing the received physical address-virtual address pair.

3. The method as set forth in claim 1 further comprising:
   extracting data in the received packet prior to the transmitting.

4. The method as set forth in claim 3 wherein the extracting comprises extracting overhead information from the received packet at the network interface controller and performing the associating based on the overhead information.

5. The method as set forth in claim 1 wherein the transmitting the retrieved virtual address comprises communicating the virtual address to the at least one processing system.

6. The method as set forth in claim 1 wherein the virtual address uniquely corresponds to the physical address.

7. The method as set forth in claim 1 wherein the virtual address corresponds to distinct physical addresses at different points in time.

8. The method as set forth in claim 1 further comprising receiving at the network interface controller a table of physical address-virtual address pairs, wherein each one of physical address-virtual address pairs in the table corresponds to a corresponding one of a plurality of logical interfaces associated with applications executing simultaneously in the at least one processing system.

9. The method as set forth in claim 8 wherein the network interface controller communicates to the at least one processing system one or more physical address-virtual address pairs from the table that have not been associated with the logical interfaces.

10. A non-transitory computer readable medium having stored thereon instructions for mapping virtual addresses to physical addresses comprising machine executable code which when executed by at least one machine, causes the machine to perform steps comprising:
    receiving a packet at a network interface controller;
    identifying a logical interface configured to handle the received packet by analyzing at least a portion of the received packet, wherein the logical interface corresponds to one or more applications executing on at least one processing system;
    assigning an available physical address to the received packet, wherein the available physical address is associated with the identified logical interface and identifies a buffer location in a buffer memory;
    retrieving, from a memory of the network interface controller, a virtual address assigned to the physical address in accordance with the identified logical interface;
    extracting data to be handled by the logical interface from the received packet;
    storing the extracted data to the buffer location in the buffer memory identified by the assigned physical address; and
    transmitting the retrieved virtual address to the at least one processing system, wherein the data stored in the buffer location can be accessed by the processing system using the corresponding retrieved virtual address.

11. The medium as set forth in claim 10 further having stored thereon instructions comprising machine executable code which when executed by the at least one machine, causes the machine to perform steps further comprising:
    receiving from the at least one processing system a physical address-virtual address pair associated with the logical interface associated with an application executing on the at least one processing system; and
    storing the received physical address-virtual address pair.

12. The medium as set forth in claim 10 further comprising:
    extracting data in the received packet prior to the transmitting.

13. The medium as set forth in claim 12 wherein the extracting comprises extracting overhead information from the received packet at the network interface controller and performing the associating based on the overhead information.

14. The medium as set forth in claim 10 wherein the transmitting the retrieved virtual address comprises communicating the virtual address to the at least one processing system.

15. The medium as set forth in claim 10 wherein the virtual address uniquely corresponds to the physical address.

16. The medium as set forth in claim 10 wherein the virtual address corresponds to distinct physical addresses at different points in time.

17. The medium as set forth in claim 10 further comprising receiving at the network interface controller a table of physical address-virtual address pairs, wherein each one of physical address-virtual address pairs in the table corresponds to a corresponding one of a plurality of logical interfaces associated with applications executing simultaneously in the at least one processing system.

18. The medium as set forth in claim 17 wherein the network interface controller communicates to the at least one processing system one or more physical address-virtual address pairs from the table that have not been associated with the logical interfaces.

19. An network device comprising:
one or more processors, a network interface controller, and a memory associated with the network interface controller, at least one of the processors or the network interface controller configured to be capable of executing instructions to implement:
receiving a packet at the network interface controller;
identifying a logical interface configured to handle the received packet by analyzing at least a portion of the received packet, wherein the logical interface corresponds to one or more applications executing on at least one processing system;
assigning an available physical address to the received packet, wherein the available physical address is associated with the identified logical interface and identifies a buffer location in a buffer memory;
retrieving, from the memory associated with the network interface controller, a virtual address assigned to the physical address in accordance with the identified logical interface;
extracting data to be handled by the logical interface from the received packet;
storing the extracted data to the buffer location in the buffer memory identified by the assigned physical address; and
transmitting the retrieved virtual address to the at least one processing system, wherein the data stored in the buffer location can be accessed by the processing system using the corresponding retrieved virtual address.

20. The network device as set forth in claim 19 wherein the physical address and the virtual address are stored in the memory as a physical address-virtual address pair.

21. The network device as set forth in claim 20 wherein the physical address-virtual address pair corresponds to the logical interface associated with one or more applications residing on the at least one processing system.

22. The network device as set forth in claim 20 wherein the at least one processor or the network interface controller is further configured to be capable of executing instructions to implement mapping logic comprising:
identifying a location in the memory storing the physical address and the virtual address;
reading the virtual address from the memory;
transmitting the data from the received packet to the physical address, wherein the physical address corresponds to a location in the buffer memory; and
transmitting the virtual address to the at least one processing system.

23. The network device as set forth in claim 20 wherein the physical address corresponds to a location in the buffer memory.

24. The network device as set forth in claim 20 wherein the at least one processing system is configured to receive a table of physical address-virtual address pairs from and forward the received table to a direct memory access engine for storage.

25. The network device as set forth in claim 20 further comprising a packet processor configured to receive overhead information from the packet and communicate the overhead information to a direct memory access engine for network layer processing.

* * * * *